July 18, 1950     R. E. WHITAKER     2,515,681
TURRET LATHE
Filed June 21, 1944                              5 Sheets-Sheet 5
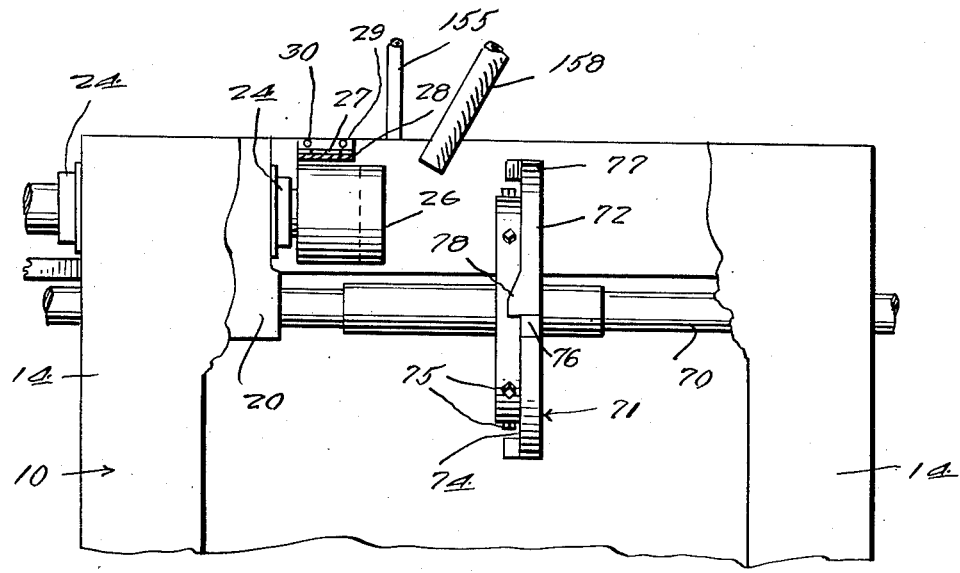
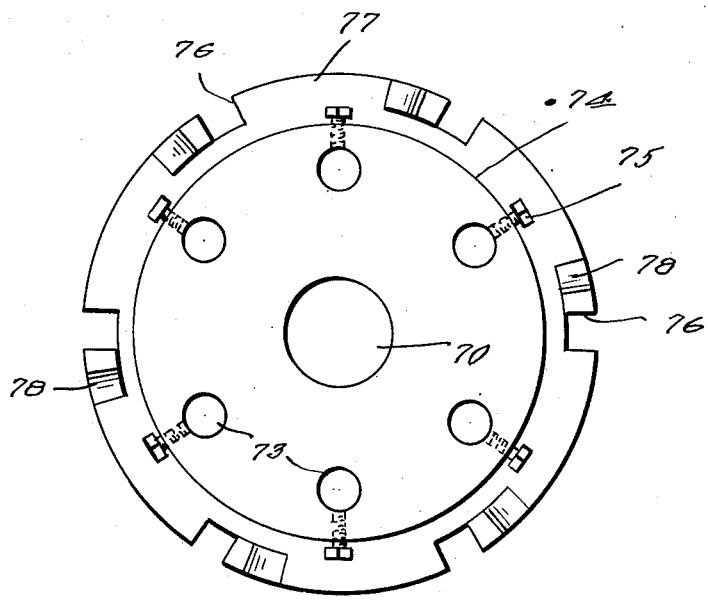
Inventor
ROLFE E. WHITAKER,
By Clarence A. O'Brien
and Harvey B. Jacobson
Attorneys Patented July 18, 1950

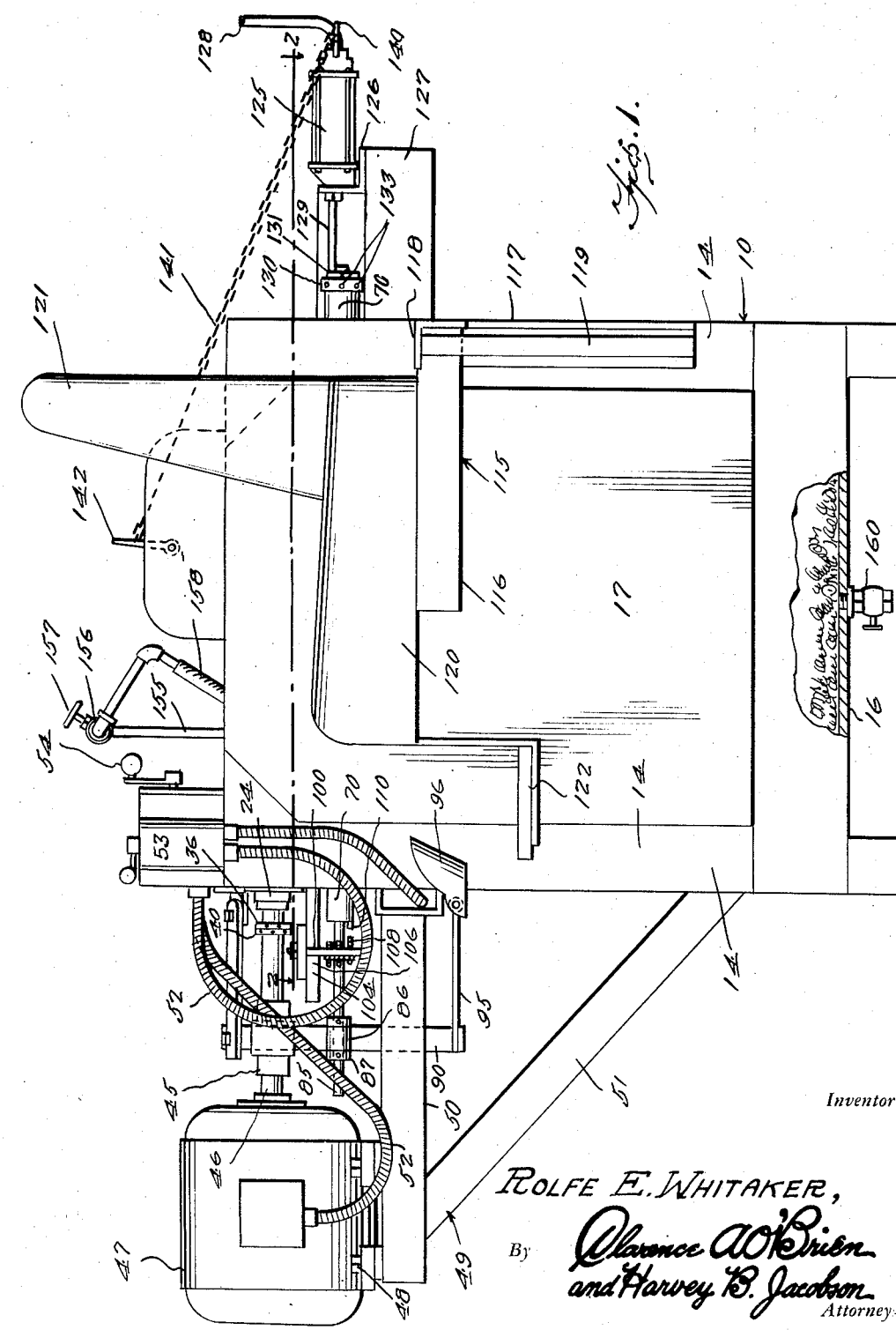

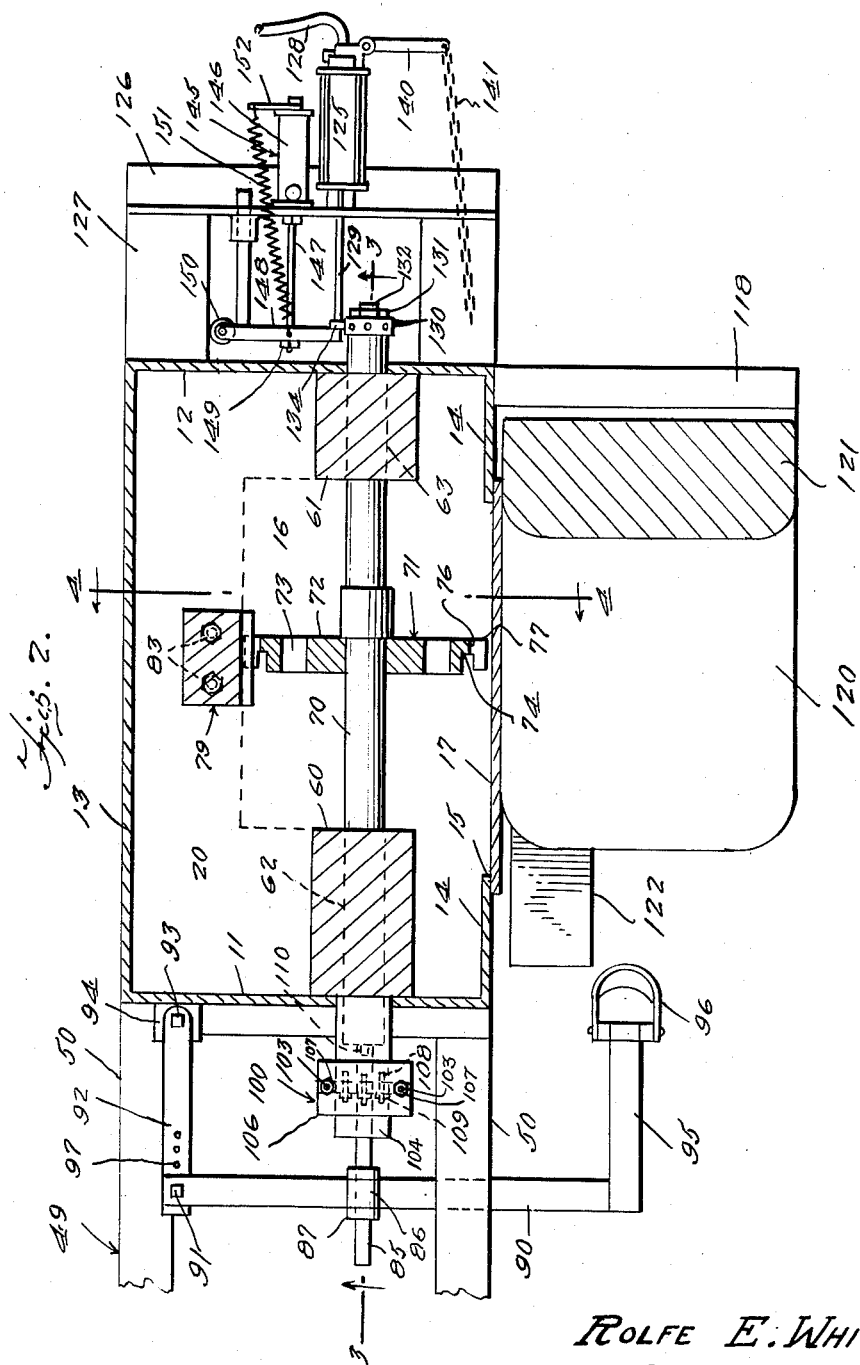

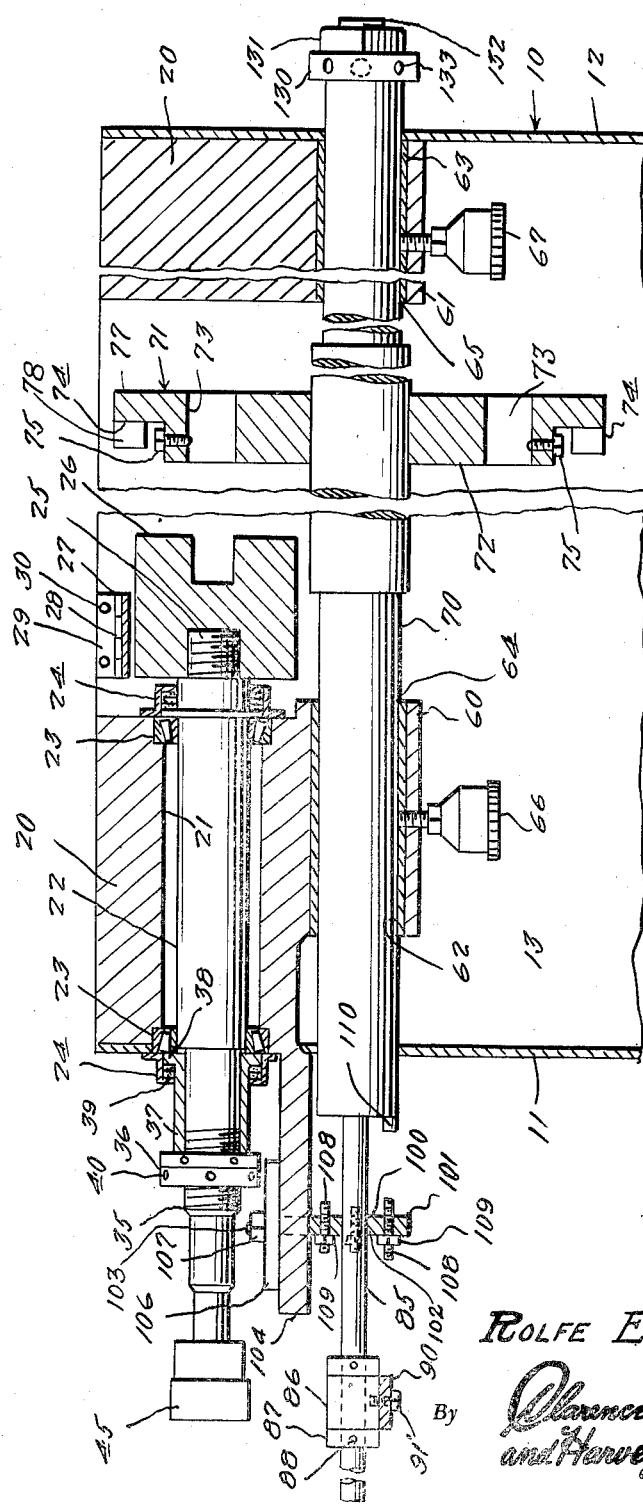

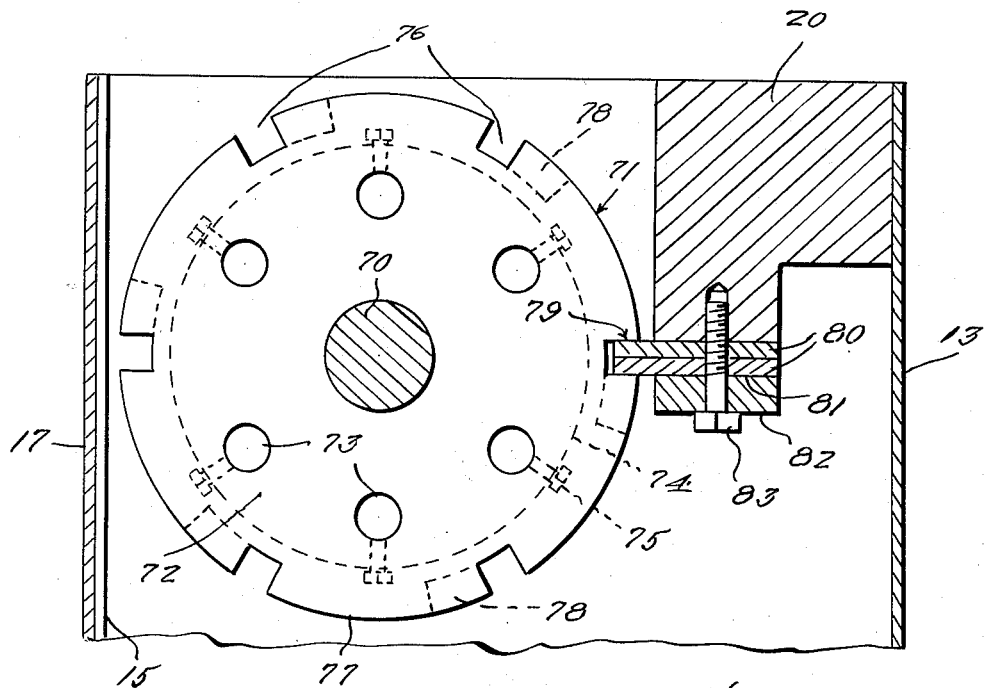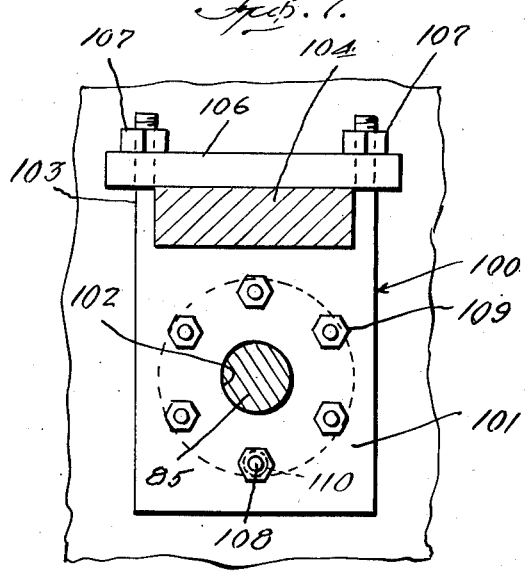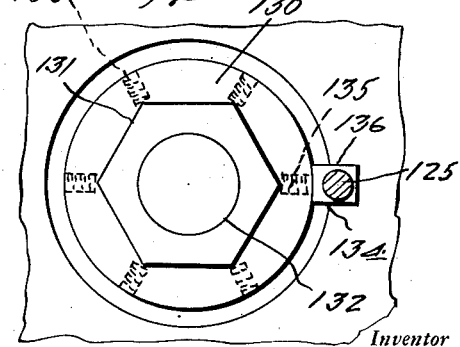

2,515,681

UNITED STATES PATENT OFFICE 2,515,681

TURRET LATHE

Rolfe E. Whitaker, Los Angeles, Calif.

Application June 21, 1944, Serial No. 541,333

3 Claims. (Cl. 29—41)

This invention relates to turret lathes and more particularly to a type of turret lathe having a tool holding turret adapted to rotate in a vertical plane, selectively to juxtapose the tools carried thereby to a piece of work to be machined.

A primary object of this invention is the provision of a turret lathe including a work holding chuck and a turret having mounted therein a plurality of tools, the turret being adapted to rotate in a vertical plane selectively to position a particular tool adjacent the work to be operated upon, mounted for rotation on a transverse bar journaled at both ends in a frame, whereby vibration or misalignment of the tool is precluded, to insure precise machining.

An additional object is the provision of improved means for locking the turret of such a lathe in such position that the selected tool is in accurate alignment with the work.

A further object is the provision of means for precluding the engagement of a tool carried by the turret with the work unless such proper alignment is achieved.

A more specific object is the provision of guide means carried by the turret to insure proper engagement of the aligning and locking means.

A more specific object is the provision of locking means for the turret carried by the periphery of the turret and comprising notches adapted to coact with a replaceable stop member whereby wear on the notches, due to their greater distance from the hub of the turret, will not materially effect the alignment of the tools carried thereby, and whereby the stop may be readily replaced should the same become worn or damaged.

A further object is the provision of an improved means, including a foot pedal operated lever, for moving the turret and its associated tools into and out of engagement with the work.

A further object is the provision of such a lathe, including a frame, to which is secured a seat for the operator thereof, whereby the operator may have more ready access to the foot pedal control and operate the lathe from a seated position.

A further object is the provision of an auxiliary means, including an air motor, for increasing and supplementing the force exerted to hold the tool in engagement with the work by the foot pedal.

An additional object is the provision of means, including a disk having removable pins therein, whereby the air motor may be engaged with the turret, when, and only when, selected tools are juxtaposed to the work.

A still further object is the provision of means including a hydraulic check for restraining the forward movement of the turret and its associated tool under the impetus of the air motor, when the tool encounters an area of less resistance, as, for example, an intersecting bore or hole within the work being machined.

Still another object of this invention is the provision of a chip or waste receiving receptacle for turret lathes of relatively large dimensions, and positioned interiorly of an enclosing frame, whereby the accumulated chips or waste of an entire day's operation of the lathe may be contained, without the necessity for periodically emptying the bin, and interrupting work on the lathe.

Still another object is the provision of a drip pan within such a relatively large receptacle for trapping, cooling or lubricating fluid utilized in connection with the machine operations.

A further specific object resides in the provision of improved stop means restricting the forward movement of the work holding chuck towards the operating tool located exteriorly of the chip bin whereby the possibility of a chip lodging on the stop and occasioning premature stoppage of the work is obviated.

Additional objects reside in the combinations of elements, arrangements of parts, and features of construction, all as will be more fully pointed out hereinafter and disclosed in the accompanying drawings, wherein there is shown a preferred embodiment of this inventive concept.

In the drawings:

Figure 1 is a side elevational view of a turret lathe constructed in accordance with this invention, certain parts thereof being shown in dotted lines, and certain other parts thereof being broken away.

Figure 2 is a sectional view taken substantially along the line 2—2 of Figure 1 as viewed from the top.

Figure 3 is an enlarged sectional view taken substantially along the line 3—3 of Figure 2, certain parts thereof being broken away.

Figure 4 is an enlarged sectional view taken substantially along the line 4—4 of Figure 2 as viewed in the direction indicated by the arrows.

Figure 5 is an enlarged fragmentary elevational view of the device as shown in Figure 1, certain parts thereof being broken away to show certain interior details of construction.

Figure 6 is an enlarged end elevational view of the turret of Figure 5 as viewed from the right.

Figure 7 is an enlarged fragmentary view of certain details of construction, certain associated parts being shown in section, and Figure 8 an enlarged fragmentary view of certain additional constructional details, certain interior parts thereof being shown in dotted lines.

Like reference numerals refer to like parts throughout the several views of the drawings.

Having reference now to the drawings, there is generally indicated at 10 a frame in the form of a housing, preferably comprised of relatively heavy sheet metal or the like, and including end walls 11 and 12, a rear wall 13, a front wall 14 having a relatively large aperture 15 therein and a base plate 16. A removable cover plate 17 serves as a closure for recess 15 in front wall 14.

End walls 11 and 12 and rear wall 13 have secured thereto in any suitable manner, as by welding, a relatively heavy metal C-shaped or U-shaped member 20 open at the front and with the sides or legs against the side walls 11 and 12 and the connection portion against the back wall 13, adapted to provide a substantially rigid and immovable support for a certain operating mechanism, to be described hereinafter. A bore 21 passed through the leg of member 20 adjacent end wall 11 is adapted to have, positioned for rotation therein a drive shaft or spindle 22, journaled in machined roller bearings 23 secured within bore 21 and held against lateral displacement by suitable flanged collars 24 secured in any desired manner to the associated leg of member 20 at opposite ends of bore 21. The inner end of drive shaft 22 terminates in a threaded portion 25 engageable with a threaded recess in a conventional work holding chuck, or head stock, 26.

A spindle or drive shaft brake 27 is positioned adjacent chuck 26, being secured as by a hinge 28 to a supporting member 29 secured in any desired manner, as by bolts 30, to a portion of member 20 adjacent chuck 26, to reard or stop rotation of chuck 26 and its associated drive shaft or spindle 22. The brake is operated by the usual hand lever (not shown) which presses the brake band 27 into frictional engagement with the outer surface of the chuck.

A portion of spindle 22 extending outwardly of frame 10 is threaded as at 35 and has threadedly engaging therewith a two-part bearing nut 36 adapted to abut a sleeve 37, which terminates adjacent end wall 11 in a flange 38, the movement of which is limited by a depending flange 39 comprising a portion of collar 24 to hold the spindle 22 and chuck 26 against end thrust. The two portions of bearing adjusting nut 36 are provided with suitably spaced holes 40 adapted to be engaged by a spanner wrench, or the like, to permit adjustment of the nut. The outer end of spindle 22 terminates in a two part flexible coupling 45, of known construction, to engage the drive shaft 46 of a source of power, such as a two speed reversible electric motor 47. Motor 47 is secured, as by bolts 48, to a frame 49 which is comprised of a plurality of extending angle irons 50 and diagonally disposed reinforcing angle irons 51, secured in any desired manner as by welding, or the like, to the end wall 11 of frame 10. Suitable flexible conduits 52 lead from motor 47 to switch boxes 53 mounted on frame 10 in a position to be readily accessible to the operator of the lathe and provided with switches or control crank handles 54 for controlling the speed and operation of the motor.

The legs of member 20 adjacent end walls 11 and 12 are provided with depending bearing portions 60 and 61, respectively, and have transverse, horizontal, aligned bores 62 and 63 therethrough. Bores 62 and 63 have positioned therein machined sleeves 64 and 65, respectively, in which are adapted to be supported, and journaled for rotation the ends of a turret shaft 70. Suitable grease cups 66 and 67 are provided to permit the insertion of lubricants within the sleeves 64 and 65.

Turret shaft 70 has fixedly secured thereto, in any desired manner, a turret generally indicated at 71, comprised of a disk-like member 72, having a plurality (as shown in the drawings, six) of tool engaging openings 73 passed therethrough. Disk 72 has a peripheral channel 74 cut into the edge thereof, from which threaded apertures extend inwardly into each of tool engaging holes 73, set screws 75 being positioned in each of the apertures to hold the tools in related assembly with and positioned in holes 73. A plurality of machined recesses 76 are cut, in accurately spaced relation transversely through the flange 77 of disk 72 extending above the base of channel 74 (see Figures 4 and 6). As best shown in Figure 6, inclined or cam surfaced guides 78 are positioned on the inner edge of flange 77 terminating in flat surfaces parallel to and in alignment with an edge or end of recesses 76. Guides 78 serve to align a recess engaging stop generally, indicated at 79, with recesses 76 to facilitate engagement of the turret with the stop. As best shown in Figure 4, stop 79 is comprised of a pair of flat metal plates 80 so dimensioned as to fit relatively tightly in an associated recess 76 to preclude any possible play of the turret. Plates 80 are positioned in a slot 81 in a depending portion 82 of the portion of member 20 adjacent rear wall 13 and held rigidly therein as by a screw 83 threadedly engaged with suitable threaded apertures in portion 82 and plates 80. Two of plates 80 are provided in order that should wear occur on the outer edges adjacent the sides of recesses 76, resulting in a loose fit of the stop witihn its associated recess, the plates may be reversed and those sides formerly juxtaposed to each other positioned outwardly so as to abut the side walls of the recess. It will now be seen that a tool contained in one of holes 73 may be suitably centered and aligned with respect to chuck 26 and firmly retained in such position, and that due to the spacing of recesses 76 and stop 79, turret 71 and its associated tools may not be moved in a direction toward chuck 26, permitting the tool to engage the work held therein, until such time as such proper alignment is effected. Turret shaft 70 terminates, at the end adjacent side wall 11 in a reduced cylindrical rod-like portion 85 exterior of frame 10. Rod 85 has a collar 86 secured in position as by washers 87 provided with set screws or locking pins 88 (see Figure 3), to permit rotative movement of rod 85 within said collar but to preclude longitudinal movement of the rod with respect thereto. A bar 90 is secured, as by a suitable screw 91′, to collar 86, a loose fit being provided to permit relative pivotal movement of bar 90 with respect to the collar. Bar 90 is pivotally secured as by a pivot 91 to a second bar 92 the opposite end of which is pivoted as by a pivot 93 to a lug 94 secured to end wall 11 of the frame. The opposite end of bar 90 has fixedly secured thereto, in any desired manner, as by welding, a member 95 terminating in a foot engaging stirrup 96. Bar 90 may be pivoted to bar 92 in a plurality of positions by passing pivot 91 through a selected one of a plurality of apertures 97 in bar 92. It will now be seen that the assemblage of bars 90, 92 and 95 form a leverage system which, when pressure is exerted against stirrup 96, either forwardly or rearwardly, occasions, through collar 86 a movement of rod 85 and turret shaft 70 thus moving turret 71 toward and away from chuck 26 as desired.

Stop means generally indicated at 100 are provided for limiting the movement of turret 71 towards chuck 26 and in the opposite direction to preclude the disengagement of the end of rod 85 from collar 86. Such means take the form of a plate 101 having a centrally disposed aperture 102 therein through which rod 85 is adapted to pass, provided with oppositely disposed upwardly extending threaded stem or shank portion 103 designed to pass on opposite sides of an extending portion 104, which may be integral with member 20 and extend outwardly through a suitable aperture in frame end wall 11, or which may comprise a separate member suitably secured to end wall 11. A plate 106 having apertures therethrough is positioned on top of portion 104, threaded members 103 passing through the apertures and the parts secured in related assembly as by nuts 107. Suitable threaded apertures are positioned about the circumference of a circle of a diameter substantially equal to that of turret shaft 70, passed through plate 101 and are adapted to be engaged by threaded studs 108, said studs extending inwardly beyond the edge or inner face of plate 101 toward the end of turret shaft 70. The end of turret shaft 70, at the point of reduction to form rod 85, is provided with a stud 110 adapted selectively to abut one of studs 108 in accordance with the position of the turret with respect to chuck 26.

A support, generally indicated at 115, and comprised of a pair of horizontal angle irons 116, secured to a vertical angle iron 117 and a third horizontal angle iron 118 extending at right angles to iron 116, the latter being reinforced by a diagonally disposed brace 119 between the outer extremity thereof and the lower end of angle iron 117, is rigidly secured to front wall 14 of frame 10. Support 115 carries a seat 120 having attached thereto a back rest 121 and a foot rest 122. Thus the operator while seated in chair 120 has readily accessible to him, for actuation, stirrup 96 to control the position of turret 71, as well as motor control switches 54.

Under certain conditions as when a particularly long drilling or boring operation is required, for example, the exertion of pressure on turret shaft 70 and its associated mechanism, becomes extremely difficult and tiring for the operator. Under such conditions supplementary means for forcing the shaft in the direction of chuck 26, and hence the associated tool into contact with the work is provided. Such means may take the form of a conventional air motor 125 carried by a supporting member 126 comprised of an angle iron or the like positioned on a pair of extensions 127 secured to end wall 12 of frame 10. Air motor 125 is supplied with compressed air through a flexible tube 128 from any suitable source of pressure, and includes the customary cylinder containing a piston (not shown) adapted to force an extending rod 129 in a direction toward the end of turret shaft 70. The adjacent end of shaft 70 has positioned thereon a collar 130, secured in position as by a nut 131 threadedly engaging a threaded reduced end 132 of shaft 70. Collar 130 has cut into the periphery thereof a plurality of threaded recesses 133 each in substantial alignment with one of tool engaging holes 73. Recesses 133 are adapted for the engagement of pins 134 comprised of threaded shanks 135 and relatively rectangular heads 136, against which heads the end of piston rod 129 is adapted to abut when pressure is applied from air motor 125. It will be seen that pins 134 may be positioned in any or all of apertures 133 whereby auxiliary pressure from air motor 125 may be exerted when any of the tools contained in tool engaging holes 73 are in position, aligned with chuck 26, or, by the omission of pins from certain of recesses 133, the use of auxiliary pressure against certain selected tools may be precluded, thus avoiding the possibility of damage to a relatively fragile tool or piece of work such as might be occasioned by an unskilled operator's use of too great force thereon. Control means for air motor 125 are provided and comprise a valve operating lever 140 connected as by a chain or other flexible coupling 141 to a second lever 142 pivotally mounted on frame 10 within easy reach of the operator seated in chair 120.

In certain circumstances, as for example, when drilling an aperture through a piece of work intersecting a transverse bore therethrough, the lowered resistance encountered by the drill or other tool normally causes the tool to surge forward, and strike against the opposite wall of such a bore with sufficient force to cause damage to the tool unless provision is made to prevent such an occurrence. Such provision is made in the instant invention and takes the form of a hydraulic check generally indicated at 145 (see Figure 2). Check 145 comprises a conventional cylinder 146 containing a compressible fluid and a piston (not shown) to which is secured a piston rod 147 which extends outwardly through a suitable aperture in an arm 148, being secured with respect thereto as by a nut 149. Arm 148 is pivoted to frame member 127 as by a pivot pin 150 and its opposite end is so positioned as to engage the head 134 of one of pins 136 at a side thereof opposite to that side engaged by rod 129. A tension spring 151 secured to arm 148 at one end and at its opposite end secured to a projection 152 adjacent the outer end of cylinder 146 serves to hold the outer end of arm 148 in juxtaposition to pin 134. Thus it will be seen that any sudden forward movement of turret shaft 70 occasioned by a lessening of the resistance to the tool carried thereby, under the impetus of pressure from air motor 125 is resisted by arm 148 and the fluid contained within hydraulic check 145 whereby such movement may continue against the force exerted by the hydraulic check, but will continue at a sufficiently slow speed to preclude damage or injury to the tool.

Suitable means, including a pipe 155, valve 156, valve control wheel 157 and a flexible tube 158 are provided for the introduction of cooling fluid or lubricant fluid to the work carried by chuck 26 and its associated tools.

It will now be seen that any shavings or chips from the work carried by chuck 26, as well as lubricant flowing therefrom, fall to the bottom 16 of frame 10 whereby the entire lower portion of the frame serves as a drip pan, and chip bin or receptacle, and the dimensions of such receptacle are sufficiently great as to permit the accumulation of a relatively great quantity of waste material without the necessity for frequent emptying of the same. The bottom of frame 10 thus also comprises a drip pan for cooling or lubricating fluid, which fluid may be drained off prior to emptying chips or waste from the receptacle as by means of a drain valve or petcock 160 (see Figure 1).

From the foregoing the use and mode of operation of this invention should be readily apparent to those skilled in the art to which the invention pertains, and accordingly further description is believed unnecessary.

It will now be seen that there is herein provided an improved turret lathe which is relatively compact and easy to operate, which may be operated with a minimum of discomfort to the operator, being capable of operation from a seated position and having all controls readily accessible to the operator, which is relatively simple in operation, sturdy and durable in construction, and particularly adapted to fine precision work, thus accomplishing all the objects of this invention and others including many advantages of great practical utility and commercial importance.

As many embodiments may be made of this inventive concept and as many modifications may be made in the embodiment hereinbefore described and shown in the accompanying drawings, it is to be understood that all matter herein is to be interpreted merely as illustrative and not in a limiting sense.

I claim:

1. In a turret lathe, a frame, a supporting member secured within said frame and surrounding an open space at the center, a drive spindle rotatably mounted horizontally through the supporting member, a work holding chuck on the inner end of the spindle in said opening, means for rotating said spindle, a turret shaft journaled in the supporting member horizontally beneath said drive spindle at opposite sides of said open space for longitudinal sliding movement, a turret secured to said shaft within said opening and having a plurality of tool holding means adapted to be adjusted relatively to the chuck, said turret having peripheral recesses, and an annular channel intersecting said recesses to form a peripheral flange, inclined cam surfaced guides positioned on the inner edge of the flange and terminating in flat surfaces parallel to and in alignment with the ends of the recesses, a stop member comprising stop plates removably mounted at the back of the frame and projecting inwardly to engage the recesses at the guides, to selectively position one of said tools in alignment with said chuck said stop plates being arranged in a substantially horizontal plane passing through the axis of the turret shaft, and extending axially over a length maintaining an engagement between it and the recesses and guides in every position during the shifting of the turret shaft, a foot operated lever pivoted in spaced relation to one end of the frame near the back thereof and connected with an end extension of the turret shaft and foot engaging means in front of the frame, said lever being operable by an operator seated in front of the frame facing the lever for shifting the turret shaft longitudinally, the opposite end of the said turret shaft projecting from the opposite end of the frame, a cylinder mounted on the frame outwardly thereof, a plunger movable in the cylinder under fluid pressure and having a rod extending inwardly parallel to the turret shaft, a collar on the turret shaft at said end engageable with said rod to move the turret shaft and turret toward the chuck, and means on the frame at the front to control the supply of fluid to said cylinder.

2. In a turret lathe, a frame, a supporting member secured within said frame and surrounding an open space at the center, a drive spindle rotatably mounted horizontally through the supporting member, a work holding chuck on the inner end of the spindle in said opening, means for rotating said spindle, a turret shaft journaled in the supporting member horizontally beneath said drive spindle at opposite sides of said open space for longitudinal sliding movement, a turret secured to said shaft within said opening and having a plurality of tool holding means adapted to be adjusted relatively to the chuck, said turret having peripheral recesses, and an annular channel intersecting said recesses to form a peripheral flange, inclined cam surfaced guides positioned on the inner edge of the flange and terminating in flat surfaces parallel to and in alignment with the ends of the recesses, and a stop member comprising stop plates removably mounted at the back of the frame and projecting inwardly to engage the recesses at the guides, to selectively position one of said tools in alignment with said chuck said stop plates being arranged in a substantially horizontal plane passing through the axis of the turret shaft, and extending axially over a length maintaining an engagement between it and the recesses and guides in every position during the shifting of the turret shaft, a foot operated lever pivoted in spaced relation to one end of the frame near the back thereof and connected with an end extension of the turret shaft and foot engaging means in front of the frame, said lever being operable by an operator seated in front of the frame facing the lever for shifting the turret shaft longitudinally, the opposite end of the said turret shaft projecting from the opposite end of the frame, a cylinder mounted on the frame outwardly thereof, a plunger movable in the cylinder under fluid pressure and having a rod extending inwardly parallel to the turret shaft, a collar on the turret shaft at said end engageable with said rod to move the turret shaft and turret toward the chuck, a lever supported at the top of the frame and connected with a fluid control valve to the cylinder to regulate the supply of fluid thereto, and means supported adjacent said cylinder and having means engageable with the turret shaft in a direction opposing the engagement of the rod therewith to resist movement of the turret shaft and turret toward the chuck and prevent sudden forward movement of the turret shaft occasioned by a lessening of the resistance to the tool carried thereby.

3. In a turret lathe, a frame, a supporting member secured within said frame and open at the center, a drive spindle rotatably mounted horizontally through the support, a work holding chuck on the inner end of the spindle in said opening, means for rotating said spindle, a turret shaft journaled in the support horizontally beneath said drive spindle at opposite sides of said opening for longitudinal sliding movement, a turret secured to said shaft within said opening and having a plurality of tool holding means adapted to be aligned with the chuck, said turret having peripheral recesses, and an annular channel intersecting said recesses to form a peripheral flange, inclined cam surfaced guides positioned on the inner edge of the flange and terminating in flat surfaces parallel to and in alignment with the ends of the recesses, and a stop member removably mounted at the back of the frame and projecting inwardly to engage the recesses at the guides, to selectively position one of said tools in alignment with said chuck, an operating lever pivoted in spaced relation to one end of the frame near the back thereof and having rotatable connection with an end extension of the turret shaft and foot engaging means in front of the frame, said turret shaft extending beyond the opposite side of the frame, a collar retained on the latter extension and having a plurality of peripheral recesses, pins insertable in said recesses, a fluid operated plunger engageable with said pins in selected positions to advance the turret shaft and turret toward the chuck upon operation of the plunger, an arm pivoted outwardly of the end of the frame to engage the opposite sides of said pins, and means connected to said arm to resist the movement of the turret shaft under the action of said plunger when the resistance to the operation of the tool in the work is lessened.

ROLFE E. WHITAKER.

REFERENCES CITED

The following references are of record in the file of this patent:

UNITED STATES PATENTS

| Number | Name | Date |
|---|---|---|
| Re. 19,095 | Ferris | Feb. 27, 1934 |
| 88,262 | Bagley | Mar. 30, 1869 |
| 406,003 | Reiss | June 25, 1889 |
| 555,447 | Hunter | Feb. 25, 1896 |
| 576,305 | Felch et al. | Feb. 2, 1897 |
| 700,368 | Pierpont | May 20, 1902 |
| 714,841 | Wells | Dec. 2, 1902 |
| 1,324,249 | Hammer | Dec. 9, 1919 |
| 1,366,757 | Whitaker | Jan. 25, 1921 |
| 1,816,829 | De Leeuw | Aug. 4, 1931 |
| 1,834,831 | Drummond | Dec. 1, 1931 |
| 1,998,873 | Kingsbury | Apr. 23, 1935 |
| 2,337,761 | Millholland | Dec. 28, 1943 |
| 2,366,908 | Jenkins | Jan. 9, 1945 |

FOREIGN PATENTS

| Number | Country | Date |
|---|---|---|
| 125,892 | Great Britain | May 1, 1919 |